Figure 1:
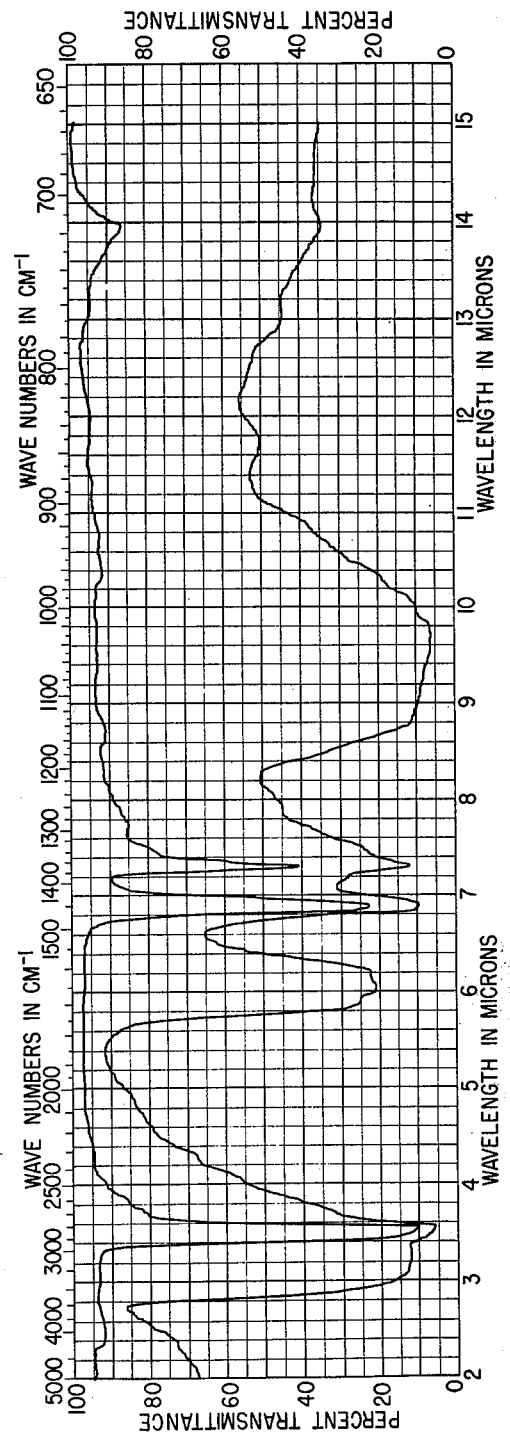

United States Patent [19]
Eble et al.

[11] 3,880,827
[45] Apr. 29, 1975

[54] ANTIBIOTIC BLUENSIN AND METHOD OF PRODUCTION

[75] Inventors: Thomas E. Eble, Kalamazoo; Le Roy E. Johnson, Kalamazoo Township, Kalamazoo County, both of Mich.

[73] Assignee: The Upjohn Company, Kalamazoo, Mich.

[22] Filed: Aug. 7, 1961

[21] Appl. No.: 129,739

[52] U.S. Cl. ............. 260/210 AB; 195/80; 424/180
[51] Int. Cl. ...................... C07g 3/00; C07c 129/18
[58] Field of Search ................. 167/65 AB; 195/80; 260/210 AB

[56] References Cited
UNITED STATES PATENTS
3,142,671   7/1964   Kawaguchi et al. ........... 260/210 AB FOREIGN PATENTS OR APPLICATIONS
215,467   5/1958   Australia .............................. 167/65

OTHER PUBLICATIONS

Pridham, "Applied Microbiology," Vol. 6, Jan. 1958, pp. 52–79, (pgs. 55 and 65 relied on).

*Primary Examiner*—Johnnie R. Brown
*Attorney, Agent, or Firm*—Roman Saliwanchik

[57]      ABSTRACT

This invention relates to a novel composition of matter and to a process for the production thereof. More particularly, this invention relates to a new compound, bluensin, and to a process for the production thereof and its use as antibacterial agent.

10 Claims, 2 Drawing Figures

INFRARED ABSORPTION SPECTRUM - BLUENSIN SULFATE

THOMAS E. EBLE
LEROY E. JOHNSON
*INVENTORS*

PAPER CHROMATOGRAM OF BLUENSIN SULFATE

ANTIBIOTIC BLUENSIN AND METHOD OF PRODUCTION

Bluensin is a biosynthetic product obtained as an elaboration product of a bluensin-producing actinomycete. It is a basic compound which has the property of adversely affecting the growth of various microorganisms, particularly Gram positive bacteria, and can be used either as the free base or as an acid addition salt, alone or in combination with other antibacterial agents, to prevent the growth of or to reduce the number of microorganisms present in various environments. For example, it is useful in wash solutions for sanitation purposes, as in the washing of hands and the clearning of equipment, floors, or furnishings of contaminated rooms or laboratories; it is also useful as an industrial preservative, for example, as a bacteriostatic rinse for laundered clothes and for impregnating paper and fabrics: and it is useful for suppressing the growth of sensitive organisms in plate assays, and other biological media. It can also be used as a feed supplement to promote the growth of mammals and birds, either alone or in combination with antibiotics.

The actinomycete used according to this invention for the production of bluensin has been designated as *Streptomyces bluensis* var. *bluensis*. One of its strain characteristics is the production of bluensin. A subculture of this variety can be obtained from the permanent collection of the Northern Utilization and Research Division, Agricultural Research Service, U.S. Department of Agriculture, Peoria, Ill., U.S.A. Its accession number in this repository is NRRL 2876.

*Streptomyces bluensis* var. *bluensis* has a colorless to yellow vegetative growth on most media. Sometimes a yellow pigment is produced. The aerial growth, which is poor, is white at first, becoming blue to gray as sporulation occurs. Sporophores occur as open loops to spirals. Its macroscopic appearance, by the method of A. Dietz, Annals of the New York Academy of Science, 60, Art. 1, pp- 152–154 (Oct. 29, 1954), is given in Table I.

TABLE I

| Agar Media | Surface | Reverse |
|---|---|---|
| Bennett's | blue | yellow |
| Czapek's Sucrose | blue | pale yellow |
| Maltose Tryptone | blue | yellow |
| Peptone-Iron | none | yellow |
| 0.1% Tyrosine | trace blue | red-tan |
| Casein Starch | trace blue-white | very pale yellow |

Its growth characteristics are given in Table II, where, except as otherwise indicated, the incubation time was 14 days and the temperature was 28°C., and the Carbon assimilation pattern is given in Table III.

TABLE II

| Medium | Cultural Characteristics | | |
|---|---|---|---|
| | Vegetative Growth | Aerial Growth | Other |
| Plain Gelatin (24°C.) | colorless | trace white | complete liquefaction |
| Nutrient Gelatin | colorless to yellow | none | complete liquefaction |
| Tryptone Broth | good colorless surface ring trace flocculent growth at base | none | none to yellow pigment |
| Nutrient Nitrate Broth | good colorless surface ring flocculent at base | none | none to yellow pigment nitrate not reduced* |
| Synthetic Nitrate Broth | fair colorless surface pellicle | none | no pigment nitrates reduced* |
| Litmus Milk | good pale to deep purple surface ring | very slight trace white | peptonization, pH 6.9 |
| Calcium Malate Agar | pale yellow | fair white | malate solubilized no pigment |
| Glucose Asparagine | pale blue green | good blue flecked with white | no pigment |
| 0.1% Tyrosine | colorless | trace white | red-tan pigment |
| Peptone-Iron Agar | colorless | none | yellow pigment |
| Maltose Tryptone Agar | pale cream yellow | good blue gray | faint yellow pigment |
| Casein Starch Agar | colorless to cream | poor blue white | no pigment starch hydrolyzed |
| Nutrient Starch Agar | pale yellow | trace pale blue white | trace yellow pigment starch hydrolyzed |
| Skim Milk Agar | red-tan | none | yellow pigment casein hydrolyzed |
| Bennett's Agar | | | |
| 18° | heavy colorless | very slight trace white | no pigment |
| 24° | colorless | trace pale blue-white | no pigment |
| 28° and 37° | colorless | good dull pale blue white | yellow reverse trace yellow pigment |
| 55° | no growth | | |
| Czapek's Sucrose Agar | | | |
| 18° | good pale cream | none | no pigment |
| 24° | colorless | trace white | cream reverse no pigment |
| 28° | heavy pink-tan | trace dull pale blue-white | no pigment |
| 37° | colorless | fair pale gray-white | fair pale gray-white reverse |
| 55° | no growth | | |

* observations on nitrate reduction were taken at 18 hrs. and 14 days.

TABLE III

Assimilation of Carbon Compounds in Synthetic Medium

Assimilation Positive

| | | | |
|---|---|---|---|
| D-Xylose | (+) | Dextrin | (+) |
| L-Arabinose | (+) | Insulin | + |
| Rhamnose | (+) | Soluble Starch | + |
| D-Fructose | (+) | Glycerol | + |
| D-Galactose | (+) | D-mannitol | (+) |
| D-Glucose | (+) | Inositol | + |
| D-Mannose | (+) | Salicin | (+) |
| Maltose | + | Na oxalate | (+) |
| Sucrose | (+) | Na tartrate | (+) |
| Lactose | + | Na acetate | (+) |
| Cellobiose | (+) | Na citrate | (+) |
| Raffinose | + | Na succinate | (+) |

Assimilation Negative

| | |
|---|---|
| Dulcitrol | (−) |
| D-Sorbitol | − |
| Phenol | − |
| Cresol | − |
| Na formate | (−) |
| Na salicylate | − |

Control (−)
+ = positive assimilation; good growth
(+) = positive assimilation; slight growth
(−) = no assimilation; slight growth
− = no assimilation; no growth The new compound of the invention is produced when the elaborating organism is grown in an aqueous nutrient medium under submerged aerobic conditions, and preferably in a nutrient medium containing a carbon source, for example, an assimilable carbohydrate, and a nitrogen source, for example, an assimilable nitrogen compound or proteinaceous material. It is to be understood also that for the preparation of limited amounts surface cultures in bottles can be employed. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed Brewer's yeast with milk solids, soybean meal, cottonseed meal, corn meal, milk solids, pancreatic digest of casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to satisfactory growth of the microorganism, for example, between about 18° and 40°C. and preferably between about 26° and 30°C. Ordinarily, optimum production of the compound is obtained in from about 2 to 10 days. The medium normally stays fairly close to neutral, or on the alkaline side, during the fermentation. The final pH is dependent, in part, on the initial pH of the culture medium which is advantageously adjusted to about pH 6-8 prior to sterilization, and the buffers present, if any.

When growth is carried out in large vessels and tanks, it is preferable to use the vegetative form of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

The new compound of the invention is a nitrogenous base having the empirical formula $C_{20-21}H_{39-41}N_5O_{14}$ which is, under ordinary conditions, more stable in the protonated, i.e., salt, form. It is a dibasic compound similar to streptothricin, streptomycin, hydroxystreptomycin, dihydroxystreptomycin, mannisidostreptomycin, but is distinguished therefrom, and some other basic antibiotics, by its elemental constitution, by containing one guanidine group, by a negative Maltol test, a positive Sakaguchi test, and a negative Biuret test, and a distinct papergram. Both the free base and the salts are relatively soluble in water and relatively insoluble in common organic solvents.

The new compound of the invention can be recovered from the filtered beer by adsorption on cation exchange resins. Both the carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd Ed. (1958), John Wiley and Sons, Inc. Carboxylic acid cation exchange resins of this type are marketed under the trade names Amberlite IRC–50, Duolite CS–101, and Ionac C–270. Suitable sulfonic acid resins include nuclear sulfonated polystyrene resins cross-linked with divinylbenzene obtained by the procedure given in page 84 of Kunin, supra. Sulfonated cation exchange resins of this type are marketed under the trade names, Dowex–50, Amberlite IR–120, Nalcite HCR, Chempro C–20, Permutit Q, and Zeokarb 225.

The protonated antibiotic is eluted from the resin with water at an acid pH, advantageously at a pH lower than the pKa' of the cation exchange resin used. Satisfactory results are obtained with a pH of about 1 to 6. The excess acid in the eluate is neutralized to about pH 6 to 7 with NaOH or a strongly basic anion exchange resin so as to remove excess acid over that necessary to protonate the basic groups. Suitable anion exchange resins for this purpose are obtained by chlormethylating by the procedure given on pages 88 and 97 of Kunin, supra, polystyrene crosslinked, if desired, with divinylbenzene prepared by the procedure given on page 84 of Kunin, supra, and quaternizing with trimethylamine, or dimethylethanolamine by the procedure given on page 97 of Kunin, supra. Anion exchange resins of this type are marketed under the trade names Dowex 1, Dowex 2, Dowex 3, Dowex 2K, Amberlite IRA–400, Amberlite JR–45, Duolite A–102, and Ionac A–300.

The novel compound of the invention can also be recovered from harvest beers and other aqueous solutions by adsorption on a surface active absorbent, for example, decolorizing carbon or decolorizing resins, and eluting the adsorbed material with an acid solution. A suitable decolorizing resin is Permutit DR (U.S. Pat. No. 2,702,263).

In accordance with a preferred isolation procedure, the whole culture medium or beer is filtered. The filtrate is admixed with or passed through a bed of adsorbent. The novel compound is eluted from the adsorbent with aqueous solutions of hydrochloric or sulfuric acids which can contain, if desired, a lower-alkanone, for example, acetone. The eluate containing protonated base is concentrated to dryness and further purified by fractional liquid-liquid extraction, for example, countercurrent distribution in a Craig apparatus or chromatography in a partition column.

The new compound of this invention is useful in treating animals (it has not yet been established as useful in human therapy) to control or mitigate the effect of some diseases which affect them. It can be used to protect fish, for example, tropical fish or trout, in aquaria or during shipment, from infections caused by microorganisms, illustratively, *Aeromonas liquefaciens* or *Aeromonas salmonicida*. It can also be used to disinfect aquaria contaminated with these and like sensitive organisms. The compound can be administered in the feed or drinking water of laboratory animals, such as rats and mice during shipment, to act prophylactically in protecting them from various infectious microorganisms, or to act therapeutically in protecting the animals when infected. It is useful in preventing odor in fish and fish crates caused by *B. subtilis*, for treating breeding places of silk worms to prevent infections caused by *B. subtilis*; and in preventing spoilage of canned foods by spore-forming bacilli. It is useful in preventing degradation and slime formation in petroleum storage tanks and cutting oils caused by *Ps. aeruginosa* in preventing spoilage of egg whites by Salmonellae; in preventing odor in fish and fish crates caused by Micrococci; and for the cold sterilization of instruments, hospital equipment, etc. where pathogenic organisms such as, Staphylococci, *E. coli, Salmonellae, P. vulgaris, K. pneumoniae*, and *Ps. aeruginosa*, are deposited and constitute a hazard through contact of humans with same.

The new compound can also be purified by conversion of the protonated or nonprotonated compounds to less soluble forms, for example by reaction with helianthic acid, Reinecke's acid, azobenzene sulfonic acid, picric acid, and the like. The salts thus obtained can be used for the same purpose as the free base, or they can be converted back to the free base and then converted to other salts such as the hydrochloride, phosphate, and sulfate.

The salts can be converted to the free base by neutralizing with an alkali or by contacting with an anionic resin, advantageously to about pH 9 to 11. Specific acid salts can then be made by neutralizing the free base with the appropriate acid to below about pH 7.5, and advantageously to about pH 2 to pH 6. Suitable acids for this purpose include hydrochloric, sulfuric, phosphoric, acetic, succinic, lactic, maleic and fumaric, methanesulfonic, benzenesulfonic, helianthic, Reinecke's, azobenzenesulfonic, picric, and like acids.

The following examples are illustrative of the process and products of the present invention, but are not to be construed as limiting. All percentages are by weight and all solvent mixture proportions are by volume unless otherwise noted.

EXAMPLE 1

Production

A soil stock of *Streptomyces bluensis*, var. *bluensis*, NRRL 2876, was used to inoculate 100 ml. of sterile pressed medium in a 500 ml. flask. The medium was of the following composition:

| | |
|---|---|
| Glucose monohydrate | 10 g. |
| Yeastolac* | 10 g. |
| NZ amine B** | 5 g. |
| Water to make | 1 liter |
| (pH adjusted to 7.0 prior to sterilization) | |

* Autolyzed Brewer's yeast with milk solids added.
** A Pancreatic digest of casein.

The medium was incubated for 2 days at 28° C. on a reciprocating shaker. The culture medium thus obtained was used to inoculate 20 liters of sterile seed medium contained in a 30 liter stainless steel tank. The medium was of the following composition:

| | |
|---|---|
| Wilson's Peptone No. 159* | 10 g. |
| Corn steep liquor | 10 g. |
| Refined cottonseed meal | 2 g. |
| Glucose monohydrate | 10 g. |
| Water to make | 1 liter |
| (pH adjusted to 7 prior to sterilization.) | |

* An enzymatic hydrolysate of proteins of animal origin, protein content approximately 57%.

The tank medium was incubated at 28° C. for 1 day and the contents were stirred continually with sparged air at the rate of 10 liters of air per minute. Twelve liters of the resulting seed growth was used to inoculate 250 liters of sterile fermentation medium contained in a 100 gallon stainless steel fermentor. The medium was of the following composition:

| | |
|---|---|
| Glucose monohydrate | 10 g. |
| Black strap molasses | 30 g. |
| Brewer's yeast | 5 g. |
| Corn steep liquor | 20 g. |
| Water to make | 1 liter |
| (pH adjusted to 7.2 prior to sterilization) | |

The fermentor medium was incubated at 28° C., sparged with air at the rate of 100 liters of air per minute, and agitated by an impeller at 280 rpm. the beer was harvested after 88 hrs. of fermentation.

EXAMPLE 2

Isolation and Purification

A 100 ml. portion of whole beer, from Example 1, was filtered at the harvest pH (pH 8.0) using 6 g. of diatomite as a filter aid. The mycelial cake was washed with 10 ml. of water, and the cake discarded. The filtered beer and wash were combined, 3 g. of activated carbon was added to make a slurry, and the slurry was stirred for 1 hr. The slurry was filtered and the carbon cake was washed with 10 ml. of water. The carbon cake was eluted with 25 ml. of a 20% aqueous acetone solution, adjusted to pH 2.0 with 1 N sulfuric acid. The aqueous acetone eluate was neutralized to pH 7 with 10% aqueous sodium hydroxide and concentrated in vacuo to remove the acetone. The resulting aqueous solution was freeze dried to yield 180 mg. of crude non-crystalline bluensin sulfate, Preparation 1.

EXAMPLE 3

Resin Adsorption

A 100 liter portion of whole beer from Example 1 was clarified by filtering with 6 kg. of diatomite as filter aid, acidifying to pH 2.5 with 1 N sulfuric acid, treating with 1 kg. of decolorizing carbon and again filtering, and treating with 500 g. of oxalic acid and filtering off the precipitate which formed. The clarified beer was then passed serially through two resin columns charged with Amberlite IRC–50, a cation exchange resin of the polyacrylic acid type (U.S. Pat. No. 2,915,432; column 8, lines 65–73), in the sodium cycle. The first or lead column was 5 cm. in diameter and 52 cm. high and was charged with 1 liter of resin and the second or trail column was 8 cm. in diameter and 45 cm. high and was charged with 2 liters of resin. The lead column was eluted with 3.3 liters of water acidified to pH 2 with 1 N sulfuric acid. The trail column was eluted with 7.5 liters of water acidified to pH 2 with 1 N sulfuric acid. Each of the eluates was adjusted to pH 5 with 10% aqueous sodium hydroxide. Acetone was added to each of the eluates to make an 80% aqueous acetone solution, 13.2 liters being added to the eluate from the lead column and 30 liters being added to the eluate from the trail column. The precipitates which resulted in both instances were removed by filtration and each was extracted with 80% aqueous methanol, one liter being used for the lead precipitate, and 3 liters being used for the trail precipitate. Insoluble materials were removed by filtration. Acetone was then added to each of the two methanolic solutions, two liters being used for the lead solution and 6 liters being used for the trail solution. Precipitates were formed in both instances. The precipitates were recovered by filtration and each was redissolved in water and freeze dried. From the lead column there was obtained 16 g. of crude bluensin sulfate, Preparation 3A, and from the trail column 19.8 g. of crude bluensin sulfate, Preparation 3B.

EXAMPLE 4

Plant scale production

Sufficient whole beer was produced in the same manner as described in Example 1 to yield 5350 liters at pH 8.2. The whole beer was treated with 16 kg. of oxalic acid, adjusted to pH 2.9 with 1 N sulfuric acid, and filtered using about 160 kg. of diatomite and about 500 liters of wash water. The filtered beer, now about 5400 liters, was adjusted to pH 7.8–8.0 with 10% aqueous sodium hydroxide and polished by filtering through a diatomite precoated filter press. The filtered beer (5300 liters) was passed downflow through two resin columns in series (a similar procedure to the trail and lead columns of Example 3). Each column was 14 inches in diameter and was charged with 4.5 cubic feet of Amberlite IRC–50 in the sodium cycle. The beer was passed through the columns at the rate of about 19 liters per minute. The spent beer was discarded and the columns were washed with deionized water. The resin columns were then individually eluted with water acidified to pH 1.2–1.5 with 1 N sulfuric acid. Each column was eluted 4 times with 100 liters each time. The lead and trail column eluates were individually pooled, concentrated to about 200 liters each, and each pool was adjusted to pH 6.4 with 10% aqueous sodium hydroxide. Activated carbon was added to each of the eluate concentrates to make a slurry, 1200 g. and 850 g. being used for the lead and trail columns, respectively, the amount of carbon used being dependent upon the solids in the concentration (1 g. of carbon for each g. of solids). After mixing each slurry well, the carbon of each was recovered by filtration and each cake was washed three times, using about 10 liters of water for each wash. Each cake was then eluted with about 200 liters each of 15% aqueous acetone.

The aqueous acetone eluate from the lead column amounted to 187 liters and on concentration and freeze drying yielded 1034 g. of bluensin, Preparation 4A. The aqueous acetone eluate from the trail column amounted to 190 liters and on concentration and freeze drying yielded 777 g. of bluensin, Preparation 4B. Preparations 4A and 4B were combined with similar material to produce Preparation 4C which was further purified by chromatography.

EXAMPLE 5

Adsorption chromatography

A carbon column was prepared in the following manner. A mixture of 16.5 kilograms each of activated carbon and diatomite was wet mixed for 1 hr. with 120 liters of deionized water adjusted to pH 3.5 with 1 N sulfuric acid. The slurry was poured into a 14 in. column on top of a layer of sea sand and cotton and packed by nitrogen at a pressure of 10 to 15 pounds. A layer of sea sand was added to the top of the column. The column was four feet tall and comprised a liquid holdup of 155 liters. The feed was 2707 g. of Preparation 4C, as prepared in the manner of Example 4. The feed was dissolved in 6.6 liters of deionized water and adjusted to pH 3.5 with 1 N sulfuric acid. Diatomite was added, sufficient to make a thick paste, and this thick paste was placed on top of the column. The column was washed with 150 liters of deionized water and then eluted with 300 liters of 10% aqueous acetone. Both wash and elution rates were about 410 ml. per minute. The following eluate pools were made:

| Liters of aqueous acetone eluate | Pool | Solids |
|---|---|---|
| 0–5 liters | No. 1 | 6 mg/ml. |
| 6–35 | 2 | 5 |
| 36–77 | 2a | 5 |
| 78–100 | 3 | 7 |
| 101–127 | 4 | 27 |
| 128–145 | 5 | 7 |
| 146–177 | 6 | 2 |
| 178–end | discarded | |

The activity closely follows the solids content of each pool. The greatest amount of activity was found in pool No. 4, (K=0.38) which on drying yielded 640 g. of bluensin, Preparation 5A.

Preparation 5A was reslurried in 670 ml. of deionized water, the mixture was heated to 45° C. and then filtered with the aid of diatomite. The filtrate was diluted with 2.5 liters of water and freeze-dried to form a cake. The cake was slurried in 1 liter of deionized water at 35° C. and then freeze-dried to produce 490 g. of essentially pure bluensin sulfate, Preparation 5B.

CHARACTERIZATION

Preparation 5B was characterized as follows:

Infrared absorption (in mineral oil mull) The infrared curve, FIG. 1, shows characteristic absorption, expressed in reciprocal centimeters, at the following frequencies: 3350–2950, 1695, 1655, 1610, 1140–960, 850, 760.

Ultraviolet absorption (in water) The ultraviolet spectrum shows no absorption maxima between 232 and 400 m$\mu$.

Elemental Analysis:

Found: C, 34.88; H, 5.63; N, 10.07; O, 45.01; S, 4.59.

Figure 2:
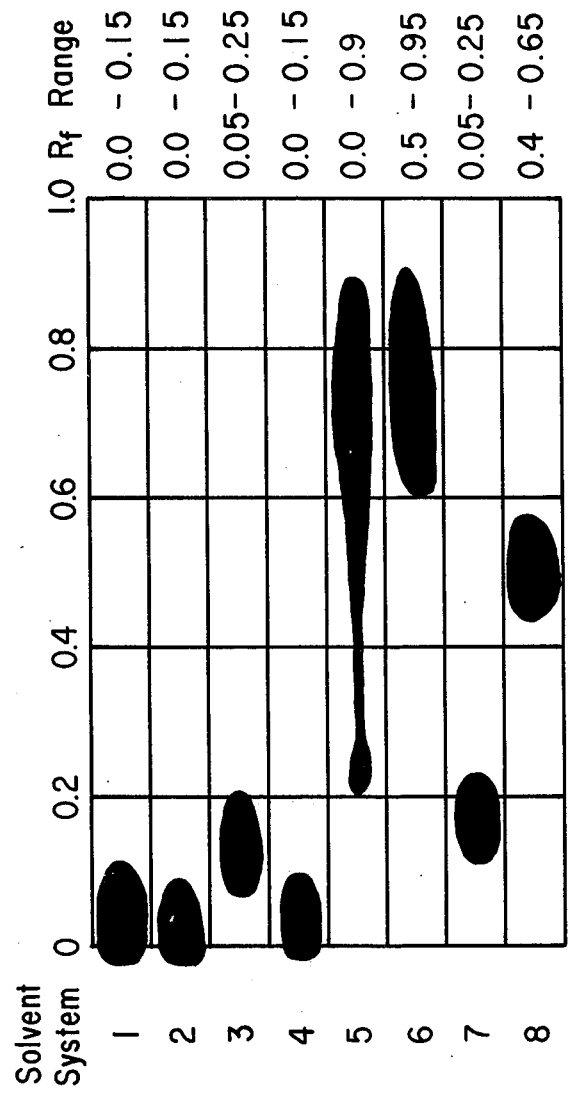

Paper Chromatography:

The typical papergram behavior pattern of bluensin, in eight solvent systems, is shown in FIG. 2. The active zone is located by bioautography with Bacillus subtilis as the test organism. Bluensin shows the following Rf ranges:

| Solvent System | Rf range |
| --- | --- |
| 1 - 1-butanol:water (84:16) | 0.0 – 0.15 |
| 2 - 1-butanol:water (84:16) plus 0.25% p-toluenesulfonic acid | 0.0 – 0.15 |
| 3 - 1-butanol:acetic acetic acid:water (2:1:1) | 0.05 – 0.25 |
| 4 - 1-butanol:water (84:16) plus 2% piperidine | 0.0 – 0.15 |
| 5 - 1-butanol:water (96:4) | 0.2 – 0.9 |
| 6 - 1-butanol:water (96:4) plus 0.25% p-toluenesulfonic acid | 0.05 – 0.25 |
| 7 - 1-butanol:water (84:16) plus 2% p-toluenesulfonic acid | 0.05 – 0.25 |
| 8 - methanol:water containing 3% NaCl (80:20) | 0.4 – 0.65 |

Equivalent weight

657 pKa'

Sulfate salt (in water) 7.6

Specific rotation $[\alpha]_D^{25} = -87°$ (in water)

Spot tests

Sakaguchi - positive.
Maltol - negative.
Ninhydrin - negative.
Biuret - negative.
Polypeptide* - negative.
* ninhydrin on acid hydrolysate.

Solubility

Bluensin is soluble in water to the extent of more than 500 and less than 1000 mg./ml. The compound is soluble in the following solvents to an extent of less than 1 mg./ml.: pyridine, chloroform, 90% ethanol, ethyl acetate, cyclohexane, benzene, acetone, dimethylformamide and dioxane.

Purity

The compound, Preparation 5B was found to be 98.2±0.8% pure by phase solubility analysis in a mixture of 70% acetone and 30% water by volume.

In vitro activity

Bluensin exhibited the following in vitro antibacterial spectrum:

| Microorganism | Broth Dilution Endpoints (mcg./ml. to inhibit) Medium | | | |
| --- | --- | --- | --- | --- |
| | BHI* | | NB* | |
| | 20 hr | 42 hr | 20 hr. | 42 hr. |
| Diplococcus pneumoniae | 125 | 125 | NG** | NG |
| Escherichia coli | 500 | 500 | 16 | 16 |
| Klebsiella pneumoniae | 64 | 250 | 4 | 4 |
| Pasteurella multocida | >1000 | >1000 | NG | >1000 |
| Proteus vulgaris | 500 | 1000 | 64 | 64 |
| Pseudomonas aeruginosa | 64 | 250 | 32 | 125 |
| Salmonella paratyphi | 125 | >1000 | 32 | 125 |
| Salmonella pullorum | 125 | 500 | 8 | 32 |
| Salmonella typhosa | 1000 | 1000 | 8 | 32 |
| Staphylococcus aureus | 1000 | 1000 | 16 | 64 |
| Staphylococcus albus | 250 | 500 | 8 | 64 |
| Streptococcus fecalis | 1000 | 1000 | 125 | 250 |
| Streptococcus hemolyticus | 32 | 64 | NG | NG |
| Streptococcus viridans | >1000 | >1000 | 125 | 250 |
| Bacillus subtilis | 64 | 125 | 8 | 16 |
| Aeromonas liquefaciens | 250 | 500 | 32 | 64 |
| Aeromonas salmonicida | 250 | 500 | 32 | 64 |

*BHI - Brain heart infusion broth; NB - nutrient broth
**NG - No growth in control tubes.

In vivo activity

Bluensin exhibited the following in vivo antibacterial spectrum tested on mice:

| Microorganism | $CD_{50}$ Route (mg./kg./da.) | |
| --- | --- | --- |
| | Subcutaneous | Oral |
| Staphylococcus aureus | 20 | 112 |
| Staphylococcus hemolyticus | 95 | >800 |
| Diplococcus pneumoniae I | 135 | >800 |
| Diplococcus pneumoniae III | 90 | >800 |
| Streptococcus viridans | 120 | >800 |
| Klebsiella pneumoniae | 8 | 268 |
| Escherichia coli | 27 | 238 |
| Salmonella paratyphi B | 26 | 214 |
| Pasteurella multocida | 45 | >800 |
| Proteus vulgaris | 14 | 188 |
| Pseudomonas aeruginosa | 170 | >800 |

$CD_{50}$ is the dose which effects 50% survival of the test animals.

Cross-resistance

Bluensin showed cross-resistance only with streptomycin and neomycin B.

EXAMPLE 6

The procedure of Examples 4 and 5, was repeated to yield 522 g. of the purified sulfate salt of bluensin, Preparation 6A, which had the following characterization:

Lack of ultraviolet absorption maxima
Infrared absorption, same as in FIG. 1.
Equivalent weight = 682
pKa' = 8.13 (in water)
Papergram: same as in FIG. 2
Optical Rotation: $[\alpha]_D^{25} = -79°$ (in water)
Elemental analysis:
Found: C, 33.81; H, 6.05; N, 9.12; O, 45.78; S, 5.05. O, 43.41;

EXAMPLE 7

Neutralization of the sulfate salt

Two grams of Preparation 5B was dissolved in 50 ml. of water. The pH was adjusted to pH 11.0 with 10% aqueous barium hydroxide. A precipitate formed (barium sulfate) which was removed by filtration. The clear solution was freeze dried to yield 1.50 g. of Preparation 7A which had the following characterization:

Lack of ultraviolet absorption maxima.
Infrared absorption, substantially as in FIG. 1.
Equivalent weight = 598
pKa' = 7.74 (in water)
Optical rotation: $[\alpha]_D^{25} = -81°$ (in water)

Elemental analysis

Found: C, 38.75; H, 6.63; N, 11.47; O, 39.69; S, 1.57.
This analysis corresponds to about ⅓ mole of sulfate.

EXAMPLE 8

Preparation of the dihydrochloride

Twenty grams of Preparation 5B was dissolved in 160 ml. of distilled water (at pH 7.0). The pH was adjusted to pH 4.5 by the addition of 1 N hydrochloric acid. A resin column was prepared containing 200 g. of Dowex 2, an anionic exchange resin, (U.S. Pat. No. 2,683,488, footnote to Table, page 2). The resin was in the chloride ion form. The solution was passed through the resin column. The resin was eluted with 640 ml. of distilled water, the eluate being retained in 100 ml. fractions. The fractions were tested to determine if they contained sulfate ions, chloride ions, or no ions. The first four 100 ml. fractions contained only chloride ions. The remaining fractions showed no ions present. Fractions 1 through 4 were pooled and freeze-dried to yield 18.73 g. of the dihydrochloride of bluensin, Preparation 8A, which exhibited the following characteristics:

Lack of ultraviolet absorption maxima.
Infrared absorption: as in FIG. 1.
Optical Rotation: $[\alpha]_D^{25} = -92°$ (in water)
Elemental analysis:
The elemental analysis is in close agreement with the empirical formula $C_{21}H_{41}N_5O_{14} \cdot 2HCl$.

Calculated:
C, 38.17; H, 6.56; N, 10.60; O, 33.93; Cl, 10.74.

Found:
C, 37.56; H, 6.78; N, 10.27; O, 34.36;
C, 38.00; H, 6.67; N, 10.49;
Cl, 10.91;
Cl, 10.90.
Equivalent weight = 626;618 (Found: 625)

EXAMPLE 9

Preparation of the reineckate

Ten grams of Preparation 5B was dissolved in about 50 ml. of water, and to this was added, with stirring, a solution of 10 gm. of Reinecke's salt in about 500 ml. of warm water. A crystalline precipitate began forming immediately. The mixture was cooled to about 4° C. and the crystalline reineckate, Preparation 9A, was recovered by filtration. A small portion of Preparation 9A, about 0.3–0.5 mg., was recrystallized twice from water by dissolving in hot water, filtering while hot, cooling to produce rosy pink crystals, and filtering to recover the crystals. The crystalline material was dried at 60° C. in vacuo. The recrystallized reineckate, Preparation 9B, had the following analysis:

Elemental analysis

The elemental analysis is in close agreement, except for hydrogen, with the empirical formula $C_{29}H_{55}N_{17}S_8O_{14}Cr_2$:
Calculated for $C_{21}H_{41}N_5O_{14} \cdot 2C_4H_7N_6S_4Cr$.
C, 28.4; H 4.52; N, 19.42; S, 20.91; O, 18.27;
Cr., 8.61.
Found: C, 28.85; H, 5.08; N, 19.09; S, 20.35; O, 18.74;
Cr., 7.81 (by diff.)

By treatment of Preparation 9B with silver sulfate, a highly purified sulfate of bluensin was obtained.

We claim:

1. The process which comprises cultivating *Streptomyces bluensis* var. *bluensis* in an aqueous nutrient medium under submerged, aerobic conditions until substantial bluensin activity is imparted to said medium by production of bluensin.

2. The process which comprises cultivating *Streptomyces bluensis* var. *bluensin* an aqueous nutrient medium under submerged, aerobic conditions until substantial bluensin activity is imparted to said medium by production of bluensin, and isolating bluensin from the culture medium.

3. The process which comprises cultivating, under submerged, aerobic fermentation conditions, *Streptomyces bluensis* var. *bluensis*, in an aqueous nutrient medium at a temperature between about 18° and 40° C. for a period between about 2 to 10 days until substantial bluensin activity is imparted to said medium by production of bluensin, separating the bluensin from the culture medium, and isolating bluensin therefrom.

4. The process which comprises cultivating *Streptomyces bluensis* var. *bluensis*, in an aqueous nutrient medium under submerged, aerobic fermentation conditions until substantial bluensin activity is imparted to said medium by production of bluensin and isolating bluensin from the culture medium by adsorption chromatography.

5. The process which comprises cultivating *Streptomyces bluensis* var. *bluensis* in an aqueous nutrient medium under submerged aerobic fermentation conditions until substantial bluensin activity is imparted to said medium by production of bluensin, isolating bluensin by adsorption on a solid adsorbent and eluting therefrom with an aqueous acid solution.

6. A member selected from the group consisting of bluensin, an antibiotic having the following physical and chemical characteristics:

1. a basic substance effective in inhibiting the growth of Gram negative and Gram positive bacteria, which in its essentially pure form is characterized by having one guanidine group, by a negative Maltol test, a positive Sakaguchi test, and a negative Biuret test; by solubility in water and relative insolubility in organic solvents; by forming a sulfate salt having an optical rotation $[\alpha]_D$ of $-87°$ in water, and a dihydrochloride salt having an optical rotation $[\alpha]_D$ of $-92°$ in water and a calculated formula $C_{21}H_{41}N_5O_{14} \cdot 2HCl$; by a papergram pattern as follows:

| Solvent System | Rf Range |
|---|---|
| 1 - 1-butanol:water (84:16) | 0.0 – 0.15 |
| 2 - 1-butanol:water (84:16) plus 0.25% p-toluenesulfonic acid | 0.0 – 0.15 |
| 3 - 1-butanol:acetic acid:water (2:1:1) | 0.5 – 0.25 |
| 4 - 1-butanol:water (84:16) plus 2% piperidine | 0.0 – 0.15 |
| 5 - 1-butanol:water (96:4) | 0.2 – 0.9 |
| 6 - 1-butanol:water z(96:4) plus 0.25% p-toluenesulfonic acid | 0.05 – 0.25 |
| 7 - 1-butanol:water (84:16) plus 2% p-toluenesulfonic acid | 0.05 – 0.25 |
| 8 - methanol:water containing 3% NaCl (80:20) | 0.4 – 0.65; | by lack of significant ultraviolet absorption; and by the following infrared absorption bands for the sulfate salt, when suspended in a mineral oil mull, expressed in reciprocal centimeters: 3350 – 2950, 1695, 1655, 1610, 1140 – 960, 850, 760; and 2. the acid addition salts of said basic substance.

7. Bluensin, the antibiotic defined in claim 6.

8. Acid addition salts of bluensin, the antibiotic defined in claim 6.

9. The hydrochloride of bluensin, the antibiotic defined in claim 6.

10. The sulfate of bluensin, the antibiotic defined in claim 6.

* * * * *